L. M. TUCKER.
MANUALLY PROPELLED VEHICLE.
APPLICATION FILED NOV. 23, 1917.
1,273,693.
Patented July 23, 1918.
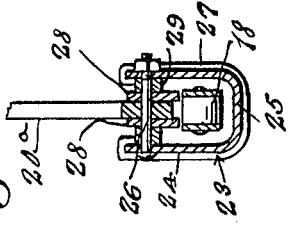
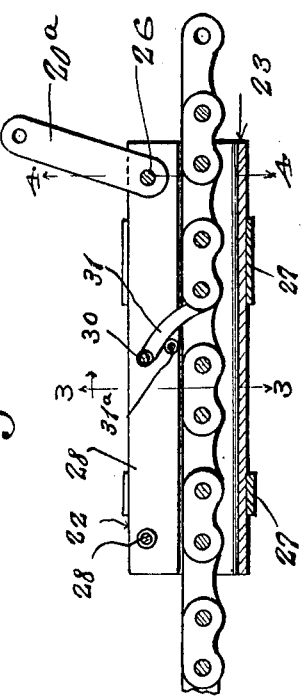
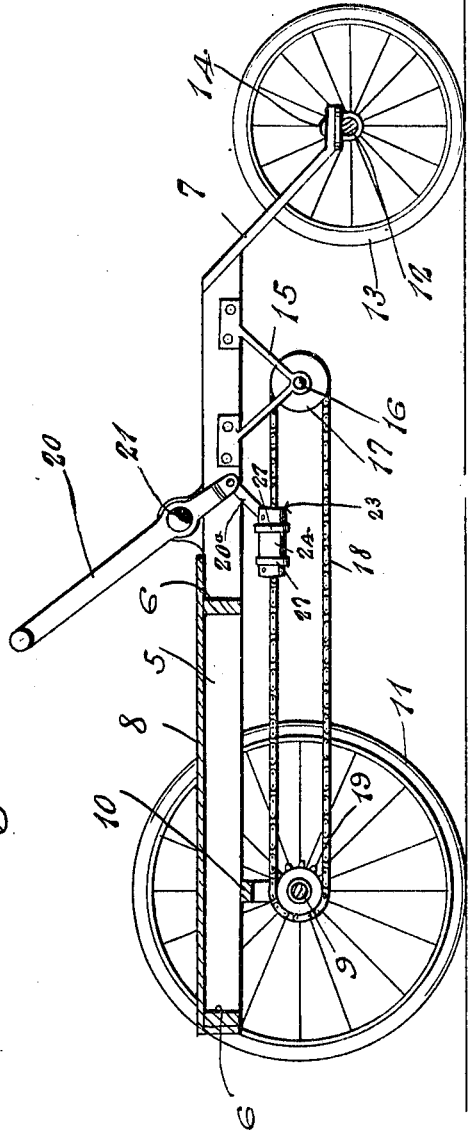
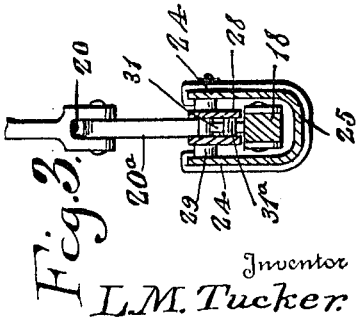
Inventor
L. M. Tucker

UNITED STATES PATENT OFFICE.

LEONARD M. TUCKER, OF SEATTLE, WASHINGTON.

MANUALLY-PROPELLED VEHICLE.

1,273,693.   Specification of Letters Patent.   Patented July 23, 1918.

Application filed November 23, 1917. Serial No. 203,560.

*To all whom it may concern:*

Be it known that I, LEONARD M. TUCKER, a citizen of the United States, residing at Seattle, in the county of King and State of Washington, have invented certain new and useful Improvements in Manually - Propelled Vehicles; and I do hereby declare the following to be a full, clear, and exact description of the invention, such as will enable others skilled in the art to which it appertains to make and use the same.

This invention has for its object to provide a manually propelled vehicle of that type which is ordinarily used by children in which the power is transmitted from the hand lever to the drive wheels through a drive chain and chain grip connected directly with the lower terminal of the hand lever.

With this and other objects in view, the invention consists in the novel construction, combination and arrangement of parts as will be hereinafter specifically described, claimed and illustrated in the accompanying drawing, in which:

Figure 1 represents a longitudinal sectional view through the vehicle,

Fig. 2 represents an enlarged sectional view through the chain grip,

Fig. 3 represents a transverse sectional view of the chain grip on the line 3—3 of Fig. 2, and Fig. 4 represents a transverse sectional view through the chain grip on the line 4—4 of Fig. 2.

Referring to the drawing in detail, wherein similar reference numerals designate corresponding parts throughout the several views, the numerals 5 indicate a pair of spaced parallel side members, which are secured in spaced relation by the transverse connecting members 6, and are connected at their forward terminals by the inclined forks 7.

A plate or board 8 is fastened upon the rear portions of the side members 5 and constitutes a seat for the driver or passenger, and the rear driving axle 9 is journaled in bearings 10 secured beneath the rear portions of the side members. The axle 9 is supported upon the propelling wheels 11 and the front axle 12, carrying the steering wheels 13 is pivotally connected at 14 with the forwardly converging arms 7, whereby the vehicle may be conveniently steered during travel.

Depending bearing arms 15 are secured to the side members 5 and rotatably support a shaft 16 on which is journaled a sprocket wheel 17. The forward portion of the sprocket chain 18 travels upon the wheel 17, and the rear portion thereof travels upon the drive sprocket wheel 19, nonrotatably secured upon the rear axle 9, whereby the movement of the chain is transmitted to the rear wheels 11 to propel the vehicle. A hand lever 20 is pivotally mounted at 21 between the side members 5, and is connected at its lower terminal by a relatively short-link $20^a$ with a chain grip, designated generally by the numeral 22 by which the swinging movement of the lever 20 in one direction is transmitted to the chain 18 to actuate the latter.

The chain grip consists essentially of a housing 23, which is substantially U-shaped in cross section, providing the side plates 24 and bottom 25, in which the chain 18 is slidably supported. The forward portions of the parallel side walls of the housing are pivotally connected by a pin 26 with the lower terminal of the lever 20, and substantially U-shaped reinforcing bands 27 are secured upon the casing adjacent its opposite terminals.

Guide strips 28 are secured in spaced relation to each other and to the side walls 24 of the housing by spacing elements 29, and the lower terminal of the hand lever 20 is pivotally confined between these guide strips. A pivot pin 30 is secured in the strips 28 intermediate their ends and pivotally support a dog or pawl 31, which is adapted to fall by gravity between the links of the chain to cause the latter to move in the housing as the latter travels in one direction. The pawl 31, as clearly shown in Fig. 2, is inclined forwardly from its pivotal axis, so that it will be operatively locked with the chain 18 as the housing 23 moves forwardly, so that the vehicle will be propelled in a corresponding direction. The pawl is limited by a stop pin 31 secured in the guide strips 28 below the pivotal axis 30 of the pawl. The stop pin 31 is designed to limit the downward movement of the pawl and prevent it from falling between the chain links.

What I claim is:

1. A manually propelled vehicle including a frame structure, supporting wheels therefor, a sprocket chain connected with the wheels, a pivoted lever, and a chain grip slidably mounted upon the chain and operable by the lever.

2. A manually propelled vehicle including front and rear wheels, a frame structure supported upon said wheels, a hand lever pivotally secured to the frame structure, a chain operably connected with the rear wheels, a hand lever pivotally secured to the frame, a wheel supporting the front end of the chain, and a chain grip pivotally connected with the lower terminal of the hand lever and operable to pull the chain forwardly during the forward swinging movement of the lower terminal of the hand lever.

3. A manually propelled vehicle including front and rear wheels, a frame structure supported upon said wheels, a pivoted hand lever, a chain operatively connected with the rear wheels for propelling the latter, a housing pivotally secured to said lever and embracing said chain, and means for causing the chain to move with the housing during the movement of the latter in one direction.

4. A manually propelled vehicle including front and rear wheels, a frame structure supported upon said wheels, a chain operably associated with the rear wheels for propelling the latter, a pivoted hand lever, a housing pivotally secured to the lower terminal of the hand lever and embracing said chain, means arranged in said housing for causing the chain to move therewith during movement of the housing in one direction, and means supporting the forward portion of said chain.

5. A manually propelled vehicle including front and rear wheels, a frame structure supported upon said wheels, a chain operably connected with the rear wheels for propelling the latter, a pivoted hand lever, a housing pivotally secured to the lower terminal of the hand lever and embracing said chain, and a pivoted pawl adapted to coact with the chain during movement of the housing in one direction to propel the vehicle.

6. A manually propelled vehicle including front and rear wheels, a frame structure supported upon said wheels, a pivoted hand lever, a chain adapted to travel upon the rear wheels to propel the latter, a housing pivotally secured to said lever and embracing said chain, a pawl in said housing adapted to coöperate with the chain to move the latter during movement of the housing in one direction, and a stop pin for limiting the movement of said pawl.

In testimony whereof I affix my signature.

LEONARD M. TUCKER.